Jan. 8, 1924.  
M. A. HARRISON  
1,479,912  
ONE-MAN CONTROL FOR TRACTOR AND TRUCK ATTACHMENTS  
Original Filed Aug. 10, 1920  
4 Sheets-Sheet 1
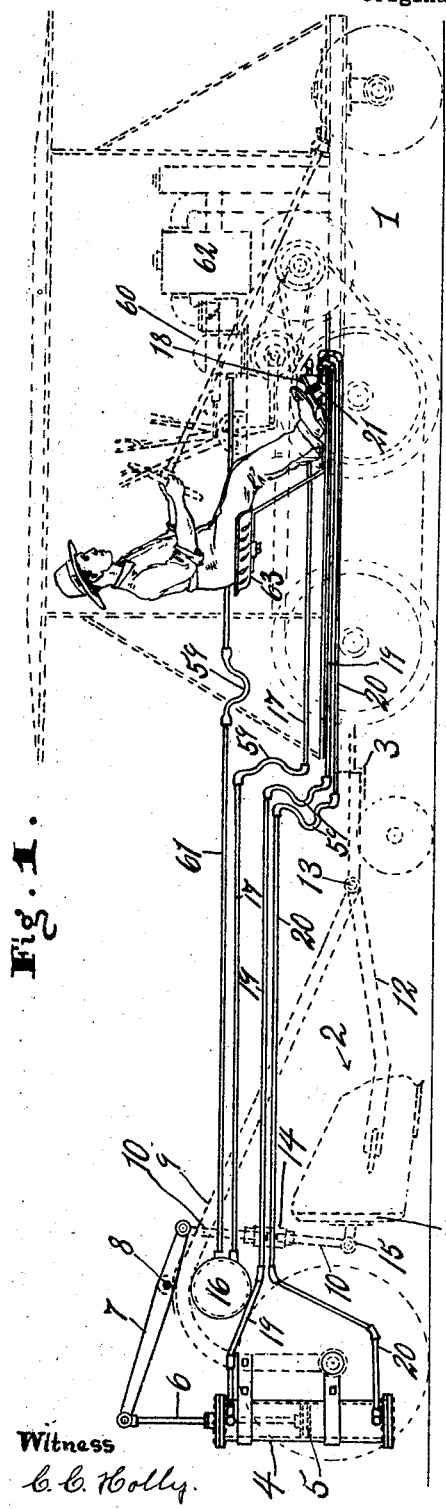
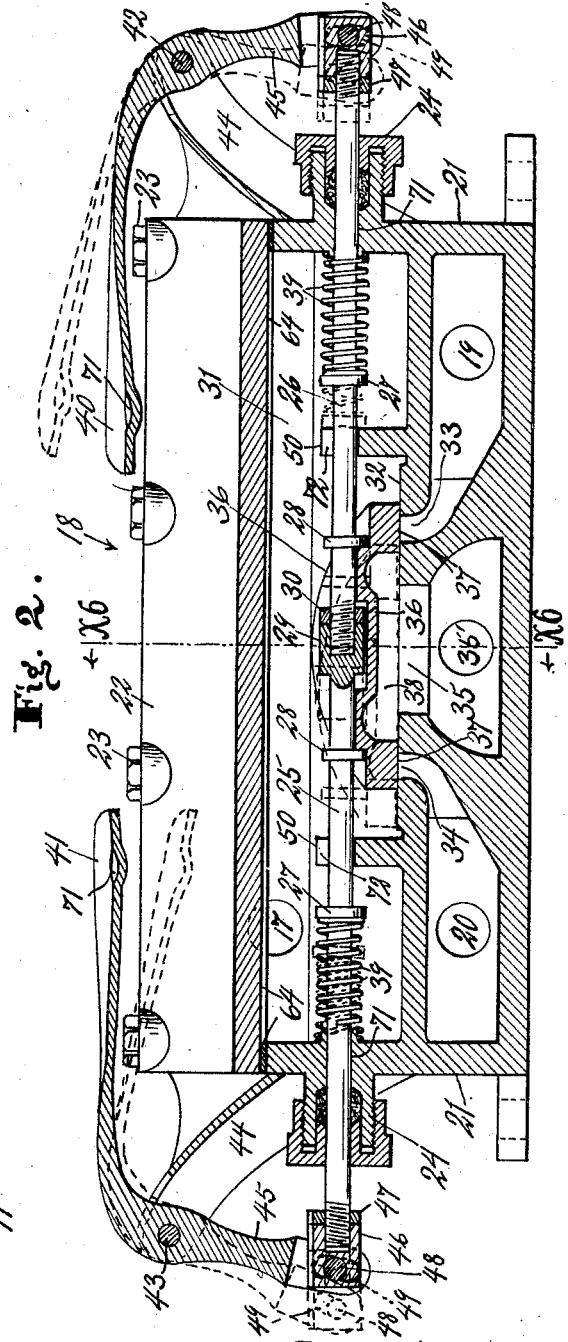
Inventor.  
Mortimer A. Harrison.  
James R. Townsend  
his atty.
Witness  
C. C. Holly.

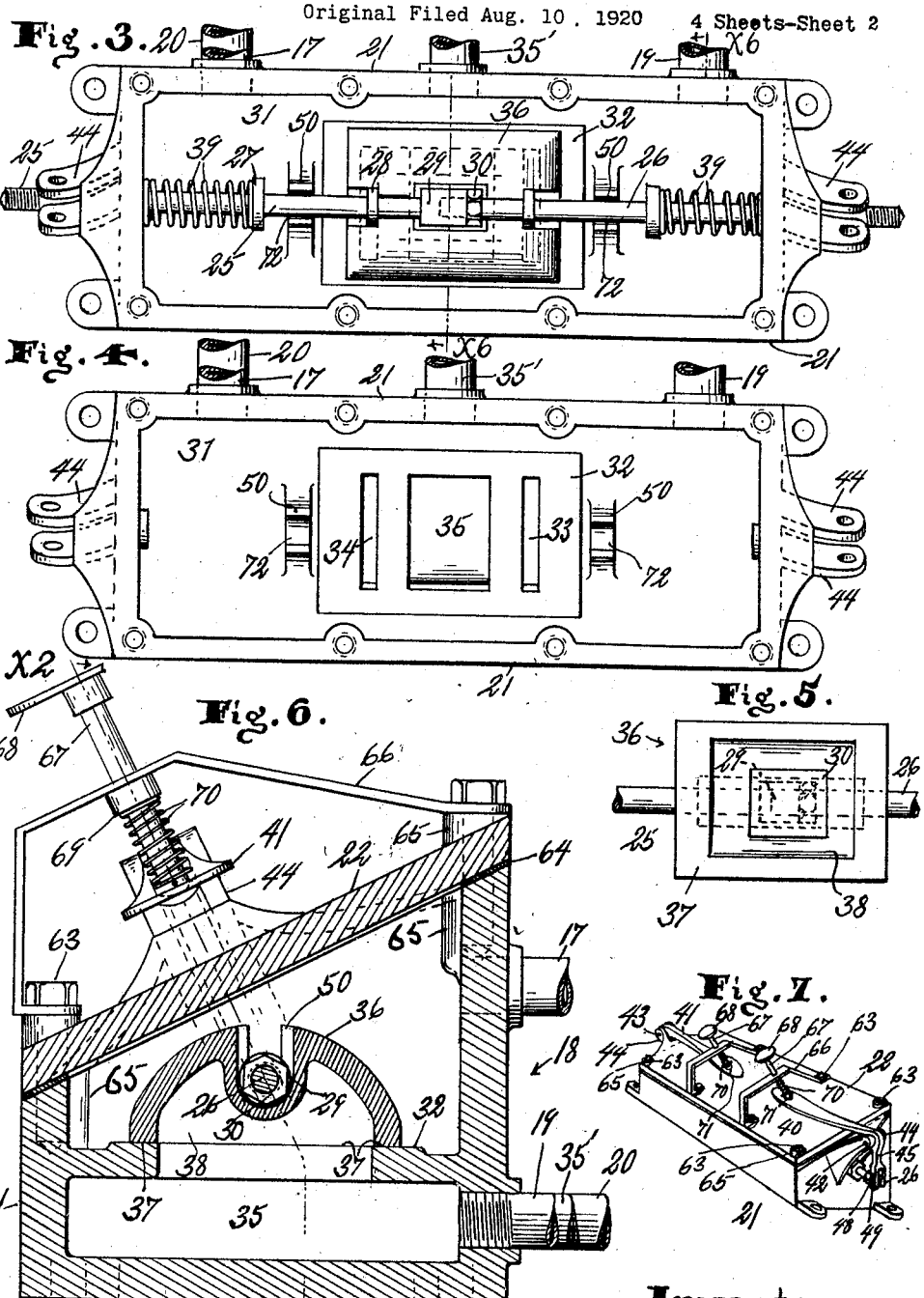

Jan. 8, 1924.  1,479,912
M. A. HARRISON
ONE-MAN CONTROL FOR TRACTOR AND TRUCK ATTACHMENTS
Original Filed Aug. 10, 1920   4 Sheets-Sheet 3

Witness.
W. M. Gentle.

Inventor.
Montimer A. Harrison.
James R. Townsend
his atty.

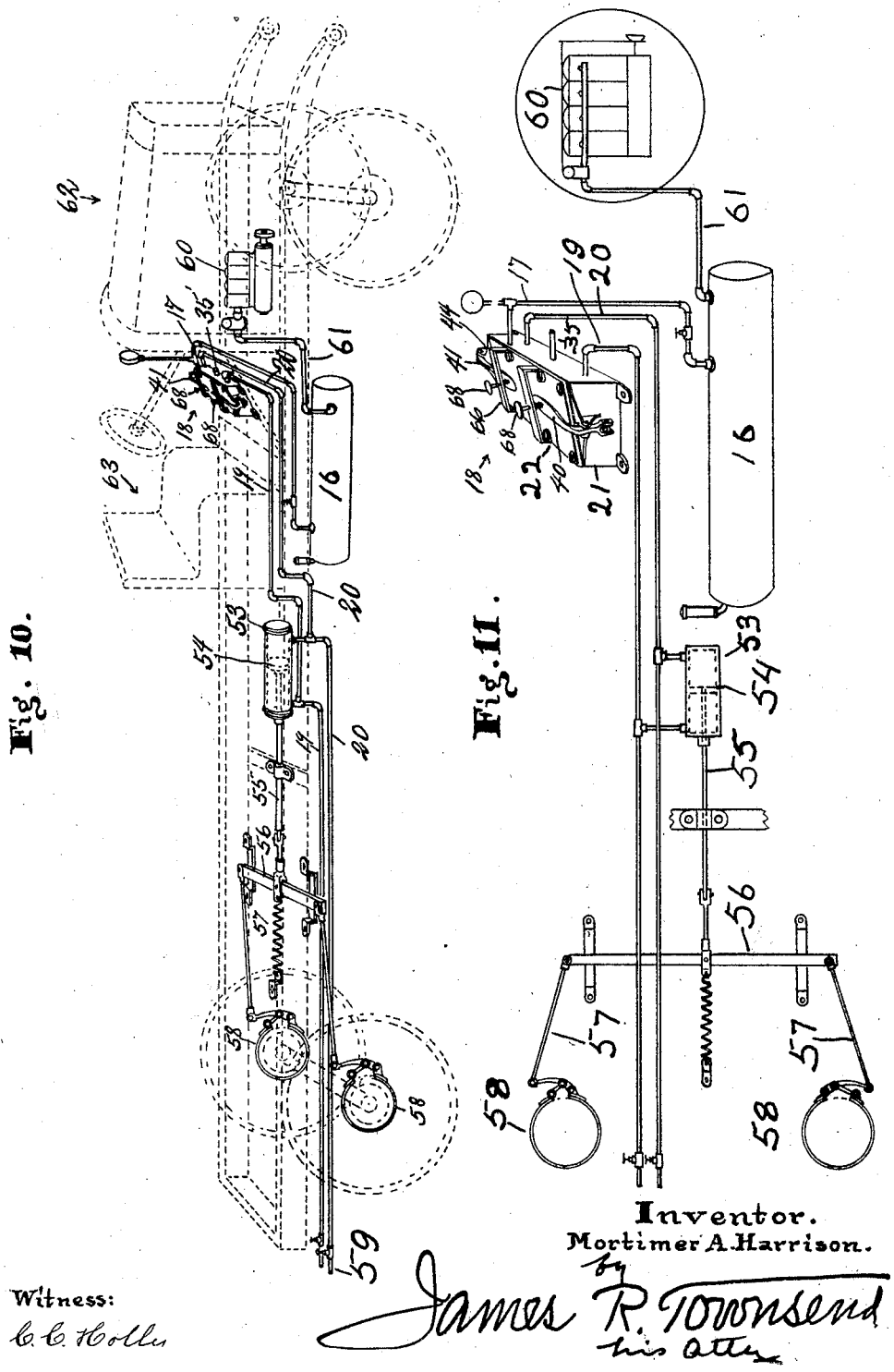

Patented Jan. 8, 1924.

1,479,912

UNITED STATES PATENT OFFICE.

MORTIMER A. HARRISON, OF MADERA, CALIFORNIA.

ONE-MAN CONTROL FOR TRACTOR AND TRUCK ATTACHMENTS.

Application filed August 10, 1920, Serial No. 402,715. Renewed October 2, 1923.

*To all whom it may concern:*

Be it known that I, MORTIMER A. HARRISON, a citizen of the United States, residing at Madera, in the county of Madera and State of California, have invented a new and useful One-Man Control for Tractor and Truck Attachments, of which the following is a specification.

At the present time tractors and trucks are often connected to other devices such as trailers and road-and-field levelers which have operable parts, the operation of which requires the attention of a helper in addition to the driver of the tractor or truck.

For example; in road-and-land levelers, a scraper blade is provided which is adjustable to different heights relative to the tread of the wheels of the device which supports the scraper blade; and the regulation of such height is effected by means of a compressed air cylinder and piston operating through suitable mechanism and controlled by the helper who stands on the leveler.

There are several serious objections attending this practice in addition to the expense of the helper. For example; at times the dust arising from the earth that is being leveled, is so thick as to prevent the helper on the leveler from seeing the holes or inequalities of the earth surface; and in consequence of this it often occurs that the helper is unable to either pick up or drop the dirt at the exact places where such operations, respectively, are necessary. This dust does not interfere with the vision of the driver of the tractor, because it is produced by the tractor itself, and only obscures the earth from the one on the leveler.

Furthermore the driver on the tractor is advised of each rise and depression of the land by the movement up and down of the tractor on which he rides, so that he can soon accustom himself to determine just what irregularities would pass under the leveler blade as the machine progresses. For this reason it is desirable that the elevation and depression of the leveler blade be controlled by an operator riding on the tractor. Heretofore this has not been possible A further objection to operating the leveler blade by one stationed on the leveler, is the dust which is forced upon the helper riding on the leveler. Said dust rising to the level of his nostrils and eyes, is suffocating and blinding. This dust rises in such a way that it often happens that the helper on the leveler is unable, on account of the dust, to see the driver on the tractor; while at the same time the driver on the tractor is in practically pure air.

Another difficulty present in the operation of the leveler blade as heretofore, is that the helper on the leveler is not so able to determine what load is put on the engine; and he frequently will stall, over-load, or cause an undue strain, on the engine. This difficulty is wholly overcome through this invention by placing the entire operation of tractor and leveler, under the control of the driver so that he can regulate the load according to the power of the engine. One reason for this discrepancy between the requirements of the work and the operation of the machine by the helper, is that the helper is unable to determine the character of the ground, whether hard or soft and proportion the depth of cut to the proper duty of the engine. The disagreeable character of the work on account of the dust makes it impossible to obtain helpers except from the class that are so inefficient that they are unable to determine the work by the sound of the engine.

An object of this invention is to make it possible for the engine driver to do the work of the helper in addition to the usual work of the driver without materially adding to his labor, and in fact at the same time giving him such perfect control of the load that the strain of operation, the feeling of responsibility, and the losses that arise on account of repairs are so reduced as to really lessen the labor of the driver. Great responsibility is taken off of his mind because he knows that he will be enabled to operate the machine to its greatest efficiency with the least likelihood of damage to the engine or other parts of the apparatus; and consequently he works under less strain.

With respect to trailers behind trucks or tractors, it is customary to fit such trailers with mechanically operated brakes which must be attended to upon certain portions of the road. Such attention usually requires a helper on one or more of the trailers with a possible connection by a rope by which the mechanically operated brake of one trailer may be controlled from another trailer or from the truck or tractor. The expense and difficulty of such an arrangement is so great that it is quite frequently the case that the trailers are not fitted with any brakes whatever; and the whole control of the train devolves upon the tractor or truck. This state of affairs frequently results in accidents.

An object of this invention is to make it perfectly feasible, at moderate expense, to bring the whole train of mechanically operated equipments of trailers and truck or tractor under the positive control of the driver; leaving his hands free for other operations.

This invention relates to a labor saving arrangement whereby compressed air controlling-means for land levelers drawn by tractors may be operated efficiently and economically. In the present state of the art it requires two men to operate the tractor drawn land-leveling outfit, one for the tractor and one for the leveler; and in the larger machines, the leveler blade is in some instances operable up and down by compressed air generated by a compressor on the tractor. It is immaterial, however, to the purposes of this invention, where the compressor is located.

An object of this invention is to provide an improvement in such machines whereby one of the operators now required may be dispensed with; and my invention is broadly new, basic and pioneer in that I mount upon the tractor under the control of the tractor driver, a compressed-air line between the air compressor and the cylinder that operates the leveler blade; and provide a valve, and yielding means whereby the valve is normally held in neutral position; said yielding means being adapted upon one or the other of two alternative movements, to apply the air to operate the leveler blade as may be required.

The invention includes the general combination above set forth and various parts and combinations of parts as will hereinafter more fully appear, and applies equally to either truck, or tractor, which, for the purpose hereof are considered as the same.

The principle of the invention is applicable for air controlled mechanical brakes on tractor or truck trailers and will be so illustrated.

Objects are cheapness, simplicity, easy installation of the controlling device, and perfect control of the parts to be operated.

Other objects, advantages and features of invention may appear from the accompanying drawings, the subjoined detail description and the appended claims.

The accompanying drawings illustrate the invention.

Figure 1 is a view illustrating the principle of a one-man controlled tractor-drawn land-leveler constructed in accordance with this invention. Parts of the tractor and leveler are shown in broken lines, and parts of the pipe connections are shown displaced from actual position, so as to avoid confusion of lines.

Fig. 2 is a sectional elevation of the control mechanism located in the air line. The section is taken longitudinally relative to the valve rod and transversely relative to the tractor, on line $x^2$, Fig. 6. Broken lines indicate a position for raising the leveler blade.

Fig. 3 is a plan view of the controlling device shown in Fig. 2, omitting the lid of the case.

Fig. 4 is a plan analogous to Fig. 3 omitting the slide and the means by which the same is operable.

Fig. 5 is a view of the under-side of the slide.

Fig. 6 is a cross-sectional elevation on line indicated at $x^6$, Figs. 2 and 3.

Fig. 7 is a perspective view of the control box ready for attachment to a tractor or truck.

Fig. 10 is an assembly view of the appliance of a truck which is shown in phantom form by broken lines.

Fig. 11 is a view partly in plan and partly perspective of the piping and control showing the circulation of air through the whole system which is installed on the truck. A fragment of the connection for the trailer breaking contrivance shown in Figs. 8 and 9 is also shown in Figs. 10 and 11.

Referring first to Figs. 1–7:—

Figure 8:
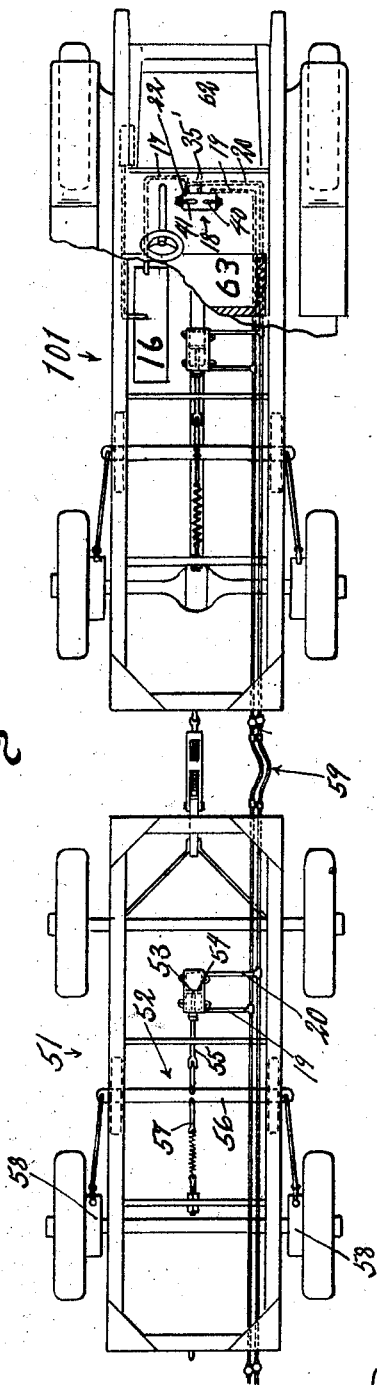
Fig. 8 is a broken diagrammatic plan of the braking outfit on a truck having two trailers, one of which is omitted from the view.

The tractor 1 and the leveler 2 may each be of any approved construction and they are detachably connected together at 3, in the usual way, so that by detaching the leveler the tractor may be used independently, and for other work than leveling.

The leveler is provided with the usual cylinder 4, piston 5 and piston rod 6 connected to the walking beam 7 which is pivoted at 8 to the leveler frame 9, and is connected by the connecting rod or rods 10 with the rear end of the leveler blade 11 which is connected with tongue 12 and pivot 13 to the leveler frame 9 that as aforesaid is detachably connected at 3 with the tractor frame. The connecting rod 10 has a turn buckle 14 for length adjustment and is pivotally connected at 15 to said blade so that as the piston operates in one direction, the blade will be moved in the other direction.

The cylinder 4 receives its air at both ends being for this purpose connected with the pressure tank 16, by the air line comprising pressure tank pipe 17, controller 18, lifting pressure feed line pipe 19, leading from the controller to one end of the cylinder, and the lowering pressure feed line pipe 20, leading from the controller to the other end of the cylinder; said controller 18 being adapted to connect, alternatively, the pipes 19 and 20 with the pipe 17.

Said controller comprises a chamber formed by box 21, open at the top and having a lid 22 which is fastened to said box by cap screws 23; said box being made air tight and provided at its ends with stuffing boxes 24 for the valve-rod sections 25, 26, each of which is provided with shoulders 27 and the block 28. Said rod sections are connected together by the box and pin screw joint 29 secured by jam nut 30, for convenience of assembly, and to secure against lost motion.

The controller box 21 is provided with upper compressed air chamber 31, in one compartment provided with the valve seat 32 having the combined reversing pressure and exhaust ports 33, 34 spaced apart on opposite sides of the final exhaust port 35 discharging through exhaust pipe 35'. The valve 36 is provided with a ground face 37 fitting the ground valve seat 32 and is also provided with the passage 38 adapted to connect the ports 33 and 34 alternatively with the exahust port 35. The valve 36 is constructed to alternatively open the ports 33 and 34 to the interior of the chamber 31, and to close both ports 33, 34.

Compression springs 39 of exactly equal tension and equal operation are arranged with one end against the box wall; the other end engaging the stops 27 and holding the rod sections 25, 26 in position to maintain the slide 36 at neutral position; in which position both of the ports 33 and 34 are closed.

Means are provided for sliding the valve rod in opposition to said springs 39, respectively; and for this purpose I have shown two treadles 40, 41 pivoted respectively at 42 and 43 to the box 21 by brackets 44 preferably shown integral therewith. Each treadle is provided with an operating arm 45 for a lost motion connection with the rod sections 25 and 26 respectively. Said lost motion connections are formed by boxes 46, screwed onto the ends of said valve rod sections, and held in place by jam nuts 47. The boxes 46 carry pins 48 working in slots 49 in the treadle arms 45. The motion of the valve is limited by stops 50 against which the lugs 27 engage to prevent too great movement of the valve slide.

Figure 9:
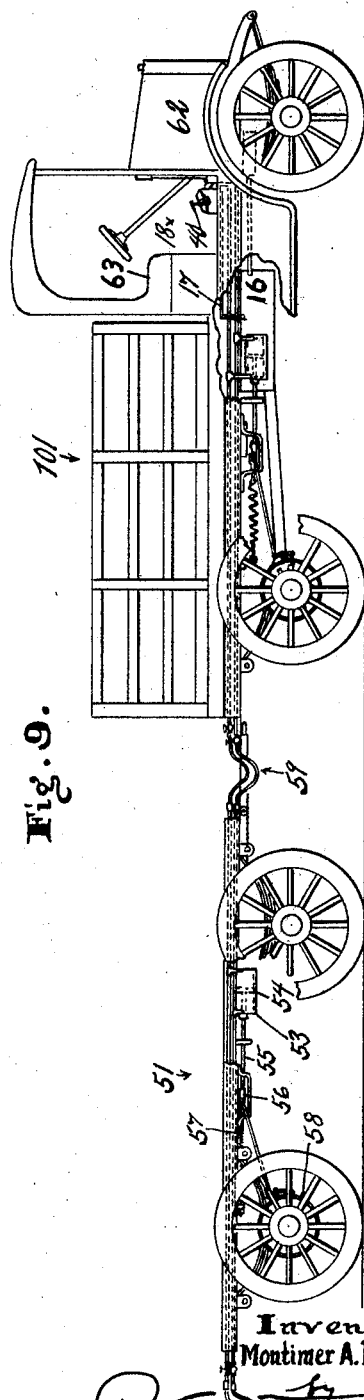
Fig. 9 is a broken side elevation of the outfit shown in Fig. 8.

In Figs. 8 and 9 the trailers 51 are each provided with the usual mechanical brakes 52 and also with a compressed air cylinder 53 and piston 54; said piston being in the cylinder and connected by piston rod 55 with an equalizer 56 that is pivoted to the spring controlled rod 57 which normally holds the brake band 58 expanded.

The construction in which the pipe lines 19 and 20 are connected with the controller 18 provided with the treadles 40, 41 corresponds to that shown in Figs. 1 and 2. The connection with pipe 20 may be used for emergency purposes in case spring 57 fails to release the brake.

Each unit of the train has the tractor 1 and a leveler 2 and its adjuncts, or the truck 101 and trailers 51, having their pipe lines connected intermediately by flexible hose connections as at 59; and the air equipment for each vehicle corresponds to that for the other. The storage tank 16 is connected with a compressor 60 on the tractor by a pipe 61.

In the braking system the trailer and truck are controlled by the foot treadles and their valves in substantially the same way as is the case with the leveler blade. The piston 54 for the brake may be of small cross-sectional area and is of limited stroke, for example, 3 inches diameter and 6 inches stroke.

The compressor 60 may be of any approved type connected to and operated by the engine 62 which may be of any usual type.

The practical operation is understood from the foregoing.

The engineer, when at his station as indicated by the seat 63, has control by one foot, of the right and left foot levers or treadles 40 and 41, and operates them as occasion requires. His hands and his other foot are thus left free to control the other operating devices adapted for such control.

As seen in Fig. 6 the cover 22 of the box or air chest 21 is detachably secured air-tight upon said box by the cap screws 63; there being a gasket 64 to make the joint tight; said cap screws being screwed into seats 65 and holding thereon brackets 66 which support the stems 67 of foot pieces 68 operable by the foot of the driver. Each of the stems 67 is provided with a shoulder 69 supported by spring 70 resting on the treadle to normally uphold the stem and to yieldingly act upon the treadle. Said brackets are omitted from Fig. 2, where depressions 71 in the treadles are shown adapted to receive the lower end of the stem 67 shown in Fig. 6.

The springs 70 rest on the treadles and serve to return the foot pieces 68 to elevated position. The springs 39 normally hold the valve rod sections in the position indicated in Fig. 2 to automatically close both compressed air ports 33, 34.

The foot pieces 68 are set aslant in parallelism with the slant of the box cover 22 so as to accommodate the foot of the operator.

On the first downward movement of the stem 67 the spring 70 has a tendency to start the pressure down upon the treadle thus allowing it to start without jar.

To assemble the structure shown in Figs. 2, 3, 4, 5 and 6, the valve rod sections 25, 26 are separately inserted through the orifices 71 in the end walls of the box and through the chamber of the stuffing boxes while said sections are disconnected at the joint 29. This can readily be done by reason of the slots 72 in the stop 50 which respectively receive the rod sections. When the sections have been separately inserted through the end walls and stuffing box chamber, they are then screwed together at 29 and the jam nuts 30 are tightened. Before thus assembling the valve rod sections, the springs 39 are placed in position. After the rod sections are in place and connected together, the glands of the stuffing box are applied and screwed home; and then the blocks 46 are screwed home after which the pins 48 are inserted through the boxing and bifurcated treadles. The method of assembling other parts of the structure will be apparent to the mechanic. The foot pieces may be threaded or otherwise detachably secured to the stems 67.

The slots 72 are preferably normal to the valve face 32 while the stem 67 is aslant; being normal to the box top 22; in consequence of which the valve rod sections 25 are normally locked against movement in line with movement of the stem 67.

In Figs. 10 and 11 parts similar to parts shown in other views are correspondingly marked.

I claim.

1. The combination with a truck or tractor and a device drawn thereby and provided with an operable part; of a compressed air cylinder having a piston therein connected to operate said operable part; a source of compressed air; a pipe leading from said source; air connections communicating with opposite ends of the cylinder; and a valve on the tractor and arranged between the pipe and said air connections to control the admission and exhaust of air to and from the opposite ends of the cylinder to operate the piston in said cylinder.

2. The combination with a truck or tractor and a device drawn thereby and provided with an operable part; of a compressed air cylinder having a piston therein; an air connection communicating with one end of the cylinder; a source of compressed air; a pipe leading from said source; and a foot operated valve on the truck or tractor, arranged between the pipe and said air connection to control the admission and exhaust of air to and from one end of the cylinder.

3. The combination with a truck or tractor and a device drawn thereby and provided with an operable part; of a compressed air cylinder having a piston therein; an air connection communicating with opposite ends of the cylinders; a source of compressed air; a pipe leading from said source and a foot-operated valve mounted on the tractor and arranged between the pipe and said air connections to control the admission and exhaust of air to and from the opposite ends of the cylinder; means to hold the valve in neutral position; and means to selectively shift the valve from neutral position to deliver air to either end of the cylinder, alternatively, and to exhaust air from the other end.

4. The combination with a truck or tractor and a device drawn thereby and provided with an operable part; of a compressed air cylinder having a piston therein; a source of compressed air; a pipe leading from said source; air connections with opposite ends of the cylinder; a foot-operated valve mounted on the truck or tractor and arranged between the compressed air pipe and connections to control the admission and exhaust of air to and from the opposite ends of the cylinder; and treadles arranged respectively to shift the valve from neutral position to selectively deliver air to either end of the cylinder alternatively for operating the piston and at the same time to exhaust air from the other end.

5. The combination with a cylinder and a piston therein; of a source of compressed air; a pipe leading to one end of the cylinder; a pipe leading to the other end of the cylinder; a box having a chamber connected to receive compressed air from the air source and provided with ports communicating respectively between said compressed air chamber and said pipes and also provided with an exhaust port; a valve adapted to automatically close all of said ports; and means operable by a driver to alternatively open the compressed air chamber to one end of the cylinder and close it to the other end of such cylinder, and to open such other end of the cylinder to the exhaust port.

6. The combination with the compressed air chamber provided with a valve seat and three ports therein; of a valve to control the ports; a valve rod operably connected to the valve and extending through the walls of the chamber; springs to normally hold the valve closed; and treadles to respectively operate the valve rod in opposition to the spring substantially as set forth.

In testimony whereof, I have hereunto set my hand at Los Angeles, California, this 31st day of July, 1920.

MORTIMER A. HARRISON.

Witness:
JAMES R. TOWNSEND.